United States Patent [19]

Baker et al.

[11] Patent Number: 4,732,638

[45] Date of Patent: Mar. 22, 1988

[54] APPARATUS FOR ROLLING BEAD RINGS

[75] Inventors: Donald E. Baker, Mesa, Ariz.; Gary L. Bowen, Meriden; John R. Thiele, Topeka, both of Kans.

[73] Assignee: The Goodyear Tire & Rubber Company, Akron, Ohio

[21] Appl. No.: 759,668

[22] Filed: Jul. 29, 1985

[51] Int. Cl.$^4$ .................. B29D 30/48; G05G 15/00; B29C 69/00

[52] U.S. Cl. .................. 156/358; 156/367; 156/422; 156/433; 156/441; 156/582; 245/1.5; 425/149; 425/150; 425/335; 425/367; 425/400; 425/518

[58] Field of Search ............... 156/136, 422, 441, 443, 156/582, 433, 446, 555, 358, 367; 245/1.5; 140/88; 29/33 F, 34 D; 425/335, 362, 363, 367, 377, 383, 392, 394, 400, 403, 35, 149, 150, 518; 152/540

[56] References Cited

U.S. PATENT DOCUMENTS

| | | | |
|---|---|---|---|
| 1,635,187 | 7/1927 | Lough et al. | 156/460 |
| 1,944,142 | 1/1934 | Abbott, Jr. et al. | 117/41 |
| 2,190,805 | 2/1940 | Shook | 156/422 |
| 2,966,107 | 8/1961 | Dieckmann | 248/287 |
| 4,452,660 | 6/1984 | Davies et al. | 156/422 |
| 4,496,411 | 1/1985 | Davies et al. | 156/136 |

Primary Examiner—Donald E. Czaja
Assistant Examiner—Thomas Bokan
Attorney, Agent, or Firm—Frederick K. Lacher; T. P. Lewandowski

[57] ABSTRACT

Upper and lower rollers have grooves for a bead ring having a clamp area portion produced by a bead winding machine. The bead ring is placed in the groove of the lower roller with the beginning of the clamp area portion in position for pressing by lowering of the upper roller so that the bead ring is engaged by the groove in the upper roller. The rollers are oscillated between the pressing position at the beginning of the clamp area and the end of the clamp area to roll the top, bottom and sides of the clamp area portion during the movement of the bead ring. The pressure on the bead ring is released by raising the upper roller at the initial pressing position at the beginning of the clamp area so that the bead ring may be removed with the same orientation it had when it was placed in the groove.

9 Claims, 7 Drawing Figures

APPARATUS FOR ROLLING BEAD RINGS

This invention relates generally, as indicated, to apparatus for preparing bead rings for assembly in a tire carcass. Bead rings have been made by winding strands of a high strength, relatively nonextensible, material such as steel wire coating with an insulating material which may be of uncured compound. In winding the bead rings, an irregularity at the inner diameter has been caused by a wire end gripper. Also the ends of the strands have not been fastened to the bead ring and this has necessitated wrapping the clamp area portion of the bead ring with a suitible material such as fabric coated with rubber.

Heretofore, it has been proposed to press the windings of a bead together while moving the bead axially in a spiral groove. This has only been possible with bead rings having cylindrical outer and inner surfaces and has not provided for maintaining the crosssectional shape of the bead ring as it is pressed. In another system, the bead rings are crimped between an inner die member and an outer die member having grooves for holding the bead rings in the area of the bead splices. Since the force for crimping the bead rings is spread over the length of the die, such a system may not be adequate for stiff bead rings such as those used in truck tires for heavy equipment.

In accordance with an aspect of this invention there is provided an apparatus for rolling a portion of a bead ring formed of multiple turns of metal wire coated with an uncured rubber compound comprising a first roller having a first rolling surface, a second roller having a second rolling surface movable radially into and out of closely spaced relationship with the first rolling surface, the first rolling surface having a circumferential first groove, the first groove having a base surface and side surfaces so that upon movement of the second rolling surface into closely spaced relationship with the first rolling surface the contoured space therebetween has substantially the same cross section as the cross section of the formed bead ring, pressure means to urge the second rolling surface of the second roller towards the first rolling surface of the first roller to press the portion of the bead ring, and means to rotate the first roller while the bead ring is pressed between the second roller and the first roller to roll the portion, means for stopping the rotation of the first roller and the second roller, and means for releasing the pressure means and retract the second roller from the first roller after the portion of the bead ring has been rolled.

In accordance with another aspect of the invention there is provided a method of rolling a portion of a bead ring formed by winding multiple turns of metal wire coated with an uncured rubber compound comprising:

(a) placing said bead ring in a circumferential first groove in a first rolling surface of a first roller with the first groove having a base and side surfaces;

(b) moving a second roller having a second rolling surface radially into closely spaced relationship with the first rolling surface to press the bead ring into engagement with the base and side surfaces of the first groove in the first roller;

(c) rotating the first roller to roll the base and side surfaces of the first groove against the length of the portion of the bead ring;

(d) stopping the rotation of the first roller;

(e) releasing the pressure on the portion of the bead ring and moving the second roller away from the first roller; and (f) removing the bead ring from the first groove of the first roller.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and, as will become apparent to those skilled in these arts, can be modified in numerous ways within the spirit and scope of the invention defined in the claims hereof.

Figure 1:
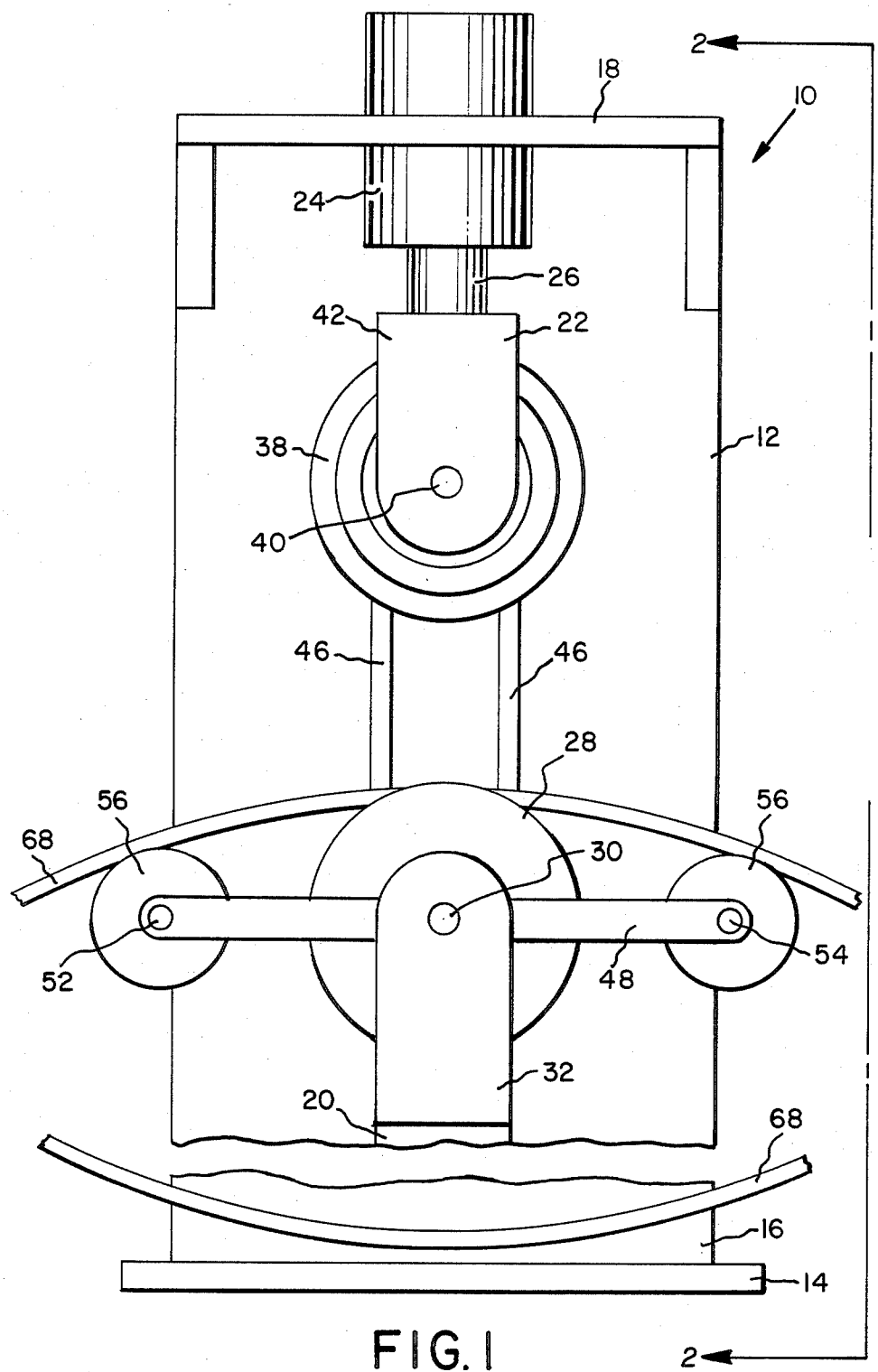
FIG. 1 is a front elevation of the apparatus embodying the invention with parts being broken away, showing the rollers in the open position with the bead rings positioned in the grooves of the lower rollers.
Figure 2:
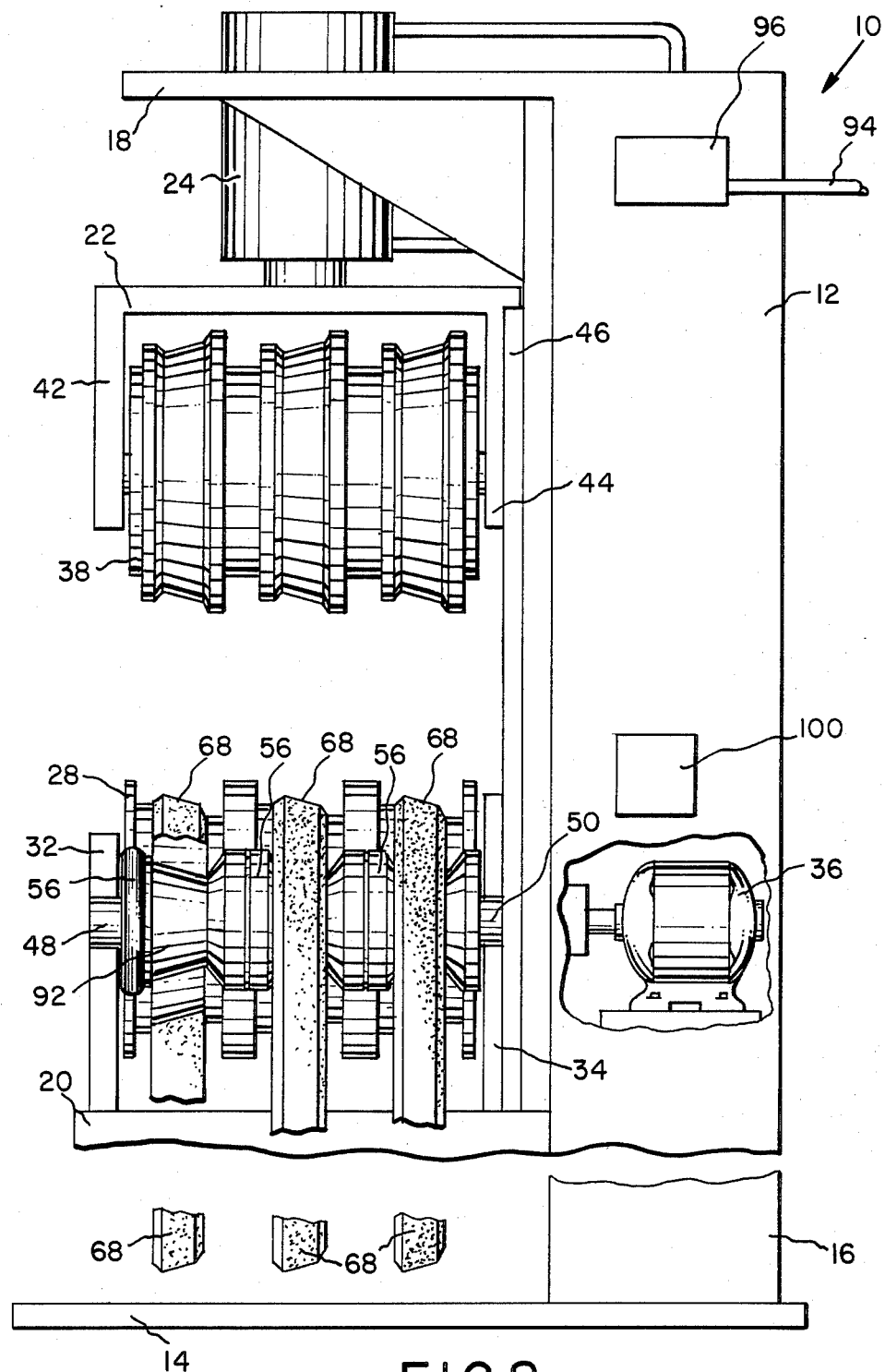
FIG. 2 is a side elevation taken along the line 2—2 in FIG. 1 with portions of the bead rings broken away to show the idler rollers.
Figure 3:
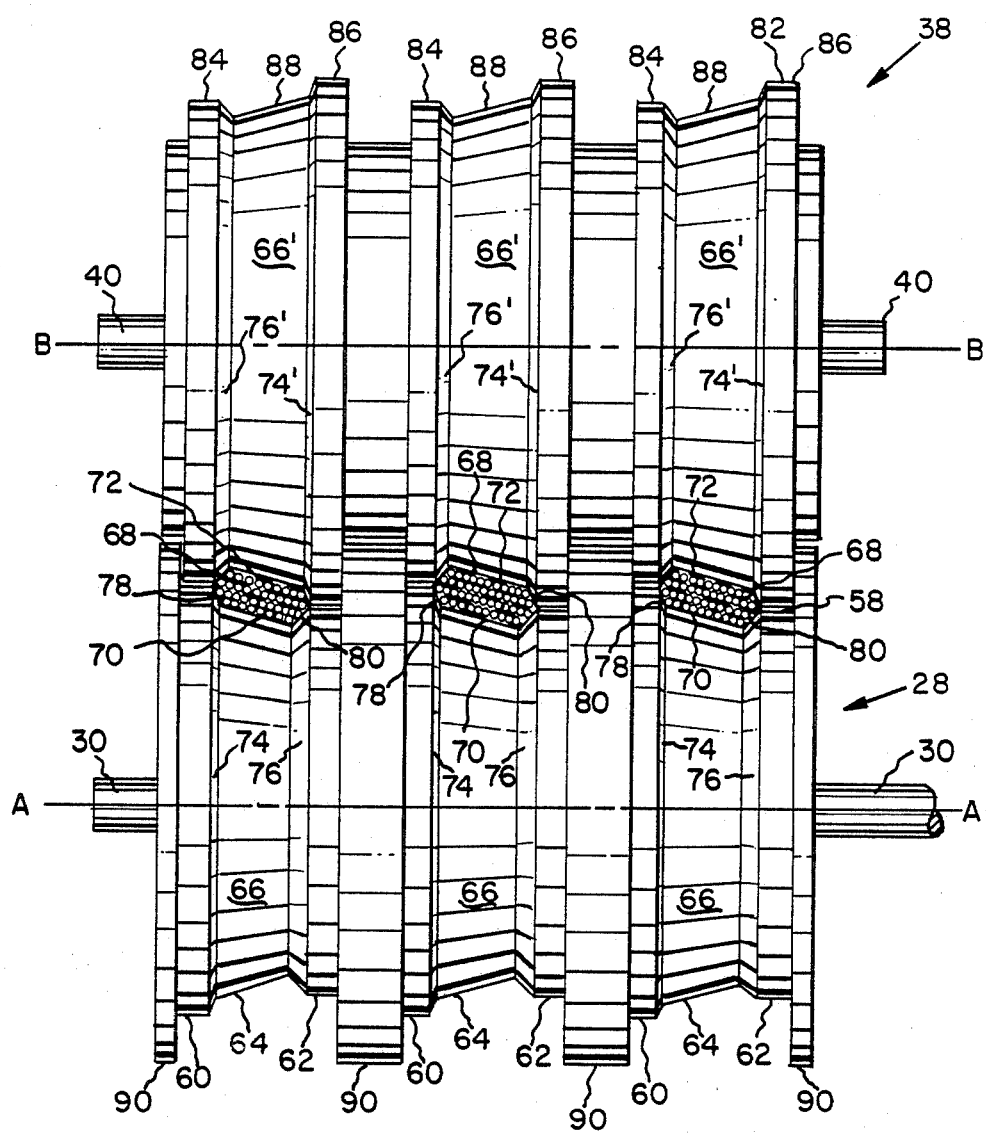
FIG. 3 is an enlarged fragmentary view of the rollers in the closed position showing the bead rings in section during the rolling process.

Referring to the drawings and especially FIGS. 1, 2 and 3, a bead ring rolling apparatus 10 representing a preferred embodiment of the invention is shown. The apparatus 10 includes a frame 12 having a base 14 for mounting on a floor and a vertical column 16 mounted on the base. An upper support member 18 and a lower support member 20 are mounted on the vertical column 16. A sliding support member 22 is disposed between the upper support member 18 and lower support member 20 and is mounted on the vertical column 16 for sliding movement in a vertical direction. A double-acting air cylinder 24 is mounted on the upper support member 18 and has a piston rod 26 connected to the sliding support member 22 for moving it toward and away from the lower support member 20.

A first roller such as lower roller 28 is supported on a shaft 30 rotatably mounted between an outboard bracket 32 and an inboard bracket 34 of the lower support member 20. The shaft 30 at the inboard bracket 34 is connected to a power unit 36 of a type well known in the art for oscillating the shaft and may include a rack and pinion (not shown). A second roller such as upper roller 38 has a shaft 40 rotatably mounted between an outboard sliding bracket 42 and an inboard sliding bracket 44 of the sliding support member 22. The inboard sliding bracket 44 may be slidably mounted in ways 46 mounted on the vertical column 16.

Cross members 48 and 50 are mounted on the outboard bracket 32 and inboard bracket 34, respectively, of the lower support member 20 and extend to positions on each side of the lower roller 28 for supporting shafts 52 and 54 extending between the cross members. Idler rollers 56 may be mounted on the shafts 52 and 54 as shown in FIGS. 1 and 2.

In FIG. 3 a more detailed enlarged view of the lower roller 28 and upper roller 38 is shown. The lower roller 28 has a lower rolling surface 58 with generally cylindrical sections 60 and 62 of different diameters and lower grooves 64 disposed between the cylindrical sections. In the embodiment shown, the lower roller 28 has three lower grooves 64. However, a greater or lesser number of grooves 64 may be provided depending upon the requirements of the apparatus 10. Each of the lower grooves 64 has a base surface 66 and, in this application, is in the form of a frustum to accommodate bead rings 68 with radially inner surfaces 70 and radially outer surfaces 72 which are sloped relative to a cylindrical surface such as the cylindrical sections 60 and 62 of the lower rolling surface 58. The lower grooves 64 also have side surfaces 74 and 76 which are tapered to conform with tapered sides 78 and 80 of the bead rings 68.

The upper roller 38 has a similar configuration as the lower roller 28 and has an upper rolling surface 82 with cylindrical sections 84 and 86 which are complementary to the cylindrical sections 60 and 62 of the lower rolling surface 58. Second grooves such as upper grooves 88 in the upper rolling surface 82 are positioned axially between the cylindrical sections 84 and 86 and have base surfaces 66' and side surfaces 74' and 76'. These surfaces are identified with the same numerals as the numerals for the surfaces of the lower grooves 64 with the addition of a prime mark because of the similarity of the groove shapes. The base surface 66' and side surfaces 74' and 76' are shaped to conform with the radially outer surfaces 72 of the bead rings 68 and with the tapered sides 78 and 80 of the bead rings. It is understood that the configuration of the lower grooves 64 and the upper grooves 88 may be varied to accommodate bead rings 68 of different cross sections. For example, some bead rings 68 have cylindrical, radially inner surfaces 70 and radially outer surfaces 72. The base surfaces 66 and 66' of the inner and outer grooves 64 and 88 for these bead rings may also be cylindrical to conform with the inner and outer surfaces 70 and 72 of the bead ring 68.

In order to maintain the upper roller 38 in alignment with the lower roller 28, cylindrical alignment flanges 90 may be provided on the lower roller for movement into closely spaced relationship with the edges of the cylindrical sections 84 and 86 of the upper rolling surface 82 as shown in FIG. 3. In the embodiment shown, the diameter of the cylindrical section 60 of the lower rolling surface 58 is about 3.4 inches (8.6 cm) and the diameter of the cylindrical surface 62 is about 3 inches (7.62 cm). The diameter of the cylindrical sections 84 of the upper roller 38 is about 3.6 inches (9.1 cm) and the diameter of the cylindrical sections 86 is about 4 inches (10.2 cm). Also the diameter of the alignment flanges 90 is about 4 inches (10.2 cm). The width of the grooves 64 and 88 depends upon the width of the bead ring 68 and in this embodiment is about 0.76 inches (1.9 cm). The slope of the base surfaces 66 and 66' of the grooves 64 and 88 is at an angle of about 15 degrees relative to an axis A—A of shaft 30 or axis B—B of shaft 40. The side surfaces 74, 76, 74' and 76' are at an angle of about 120 degrees to the base surfaces 66 and 66'. As shown in FIG. 3, the configuration of the grooves 64 and 88 are such that when the upper rolling surface 82 is brought into closely spaced relationship with the lower rolling surface 58, the space defined by the base surfaces 66, 66' and the side surfaces 74, 76, 74' and 76' will have a cross section which is substantially the same as the cross section of the bead ring 68.

In order to guide the bead rings 68, the idler rollers 56 may also have grooves 92 with a base surface in the form of a cylinder or a frustum as shown in FIG. 2.

The air cylinder 24 is in communication with a source of air pressure (not shown) through a pipe 94 having a pressure controller 96 shown schematically in FIG. 2. The pressure controller 96 may be of a type well known in the art for setting the desired pressure in the air cylinder 24 either manually or automatically and includes controls for moving the piston in the double-acting air cylinder up or down to actuate the apparatus 10. Electrical controls 100 of a type well known to one skilled in the art may also be connected to the power unit 36 for manually or automatically oscillating the shaft 30 of the lower roller 28.

Figure 4:
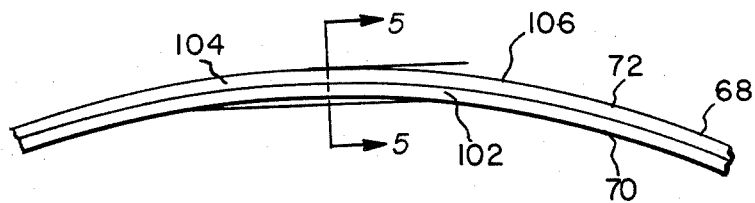
FIG. 4 is a fragmentary side view of a bead ring showing the clamp area portion as produced.
Figure 5:
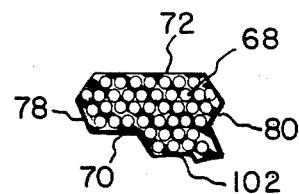
FIG. 5 is a sectional view of the beginning of the clamp area portion taken along line 5—5 in FIG. 4.

The apparatus 10 described herein is especially adapted for finishing each of the bead rings 68 formed of multiple turns of metal wire strands coated with an uncured rubber compound. The bead rings 68 are wrapped or produced by a bead winding machine in which the strands at the radially inner diameter 70 are clamped in a clamp area portion 102 having a beginning 104 and an end 106 as shown in FIG. 4. The ends of the strands protrude from the radially inner surface 70 and from the radially outer surface 72.

In operation of the bead ring rolling apparatus 10, the sliding support member 22 is raised to the position shown in FIGS. 1 and 2 by communicating air pressure to the air cylinder 24 causing the piston rod 26 to move upward and carry the sliding support member 22 and the upper roller 38 away from the lower roller 28 so that bead rings 68 may be placed in the lower grooves 64 and over the idler rollers 56 in the grooves 92. Air pressure may then be admitted to the air cylinder 24 causing the sliding support member 22 to move downward in the ways 46 and carry the upper roller 38 to a position with the upper rolling surface 82 in closely spaced relationship with the lower rolling surface 58 as shown in FIG. 3. The air pressure in the air cylinder 24 is selected and controlled by the pressure controller 96 to compress each of the bead rings 68 at the beginning of the clamp area portion 102 by confining the strands between the surfaces 66, 74, and 76 of the lower grooves 64 and the surfaces 66', 74', and 76' of the upper grooves 88. Preferably the pressure is sufficient to compress the bead rings 68 but of a magnitude so that the lower rolling surface 58 is not engaged by the upper rolling surface 82. In this way, if there are variations in the thickness of the insulation around the strands, there will be sufficient compression regardless of these variations.

Figure 6:
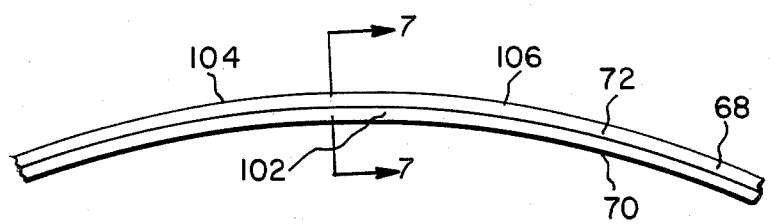
FIG. 6 is a view like FIG. 4 after splice rolling.
Figure 7:
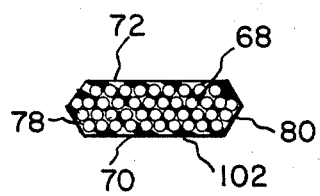
FIG. 7 is a sectional view like FIG. 5 after splice rolling taken along the line 7—7 in FIG. 6.

After the sliding support member 22 has been lowered and each of the bead rings 68 pressed at the beginning 104 of the clamp area portion 102, a power unit 36 is actuated either manually or automatically as by the controls 100 of a type well known to those skilled in the art to rotate the shaft 30 and the attached lower roller 28 in a direction so that the clamp area portion of each of the bead rings 68 is rolled between the upper rolling surface 82 and lower rolling surface 58 to a position at the end 106 of the clamp area portion. Then the power unit 36 reverses the rotation of the shaft 30 and lower roller 28 so that the lower rolling surface 66 and the upper rolling surface 82 rolls the clamp area portion 102 from the end 106 to the beginning 104 providing an oscillating action which compresses the bead strands at the radially outer surface 72 while constraining the tapered sides 78 and 80 to provide the bead configuration shown in FIGS. 6 and 7 after rolling.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for rolling the wire ends in a clamp area portion of a bead ring formed of multiple turns of metal wire coated with an uncured rubber compound comprising at least a pair of rollers each having a rolling surface, and one of said rollers being movable radially into and out of closely spaced nonengaging relationship with the other of said rollers, said rolling surface of one of said rollers having a first groove, said first groove having a base surface and side surfaces so that upon movement of said rolling surface of the other of said rollers into closely spaced relationship with said rolling surface of said one of said rollers the contoured space therebetween has substantially the same cross section as the cross section of the formed bead ring, pressure means to urge said rolling surface of one of said rollers towards said rolling surface of the other of said rollers to first, maintain said rolling surfaces spaced apart to provide the cross section of said contoured space therebetween, and second to thereby enable the wire ends to be conformed to said cross section by said rollers under the pressure applied by said pressure means, and drive means rotating at least one of said rollers in one direction to roll said clamp area portion from a beginning position at one end to an ending position at the other end while said clamp area portion of said bead ring is pressed between said rollers.

2. Apparatus as claimed in claim 1 wherein said rolling surface of said one of said rollers has a circumferential second groove having a base surface and side surfaces and said contoured space between said rolling surfaces is defined substantially by said base surface and side surfaces of said first groove and said second groove.

3. Apparatus as claimed in claim 1 wherein said pressure means includes a piston and cylinder assembly connected to said one of said rollers.

4. Apparatus as claimed in claim 1 wherein said one of said rollers is a lower roller and said other of said rollers is an upper roller positioned above said one of said rollers.

5. Apparatus as claimed in claim 4 wherein idler rollers are positioned at each side of said one of said rollers to guide said bead ring.

6. Apparatus as claimed in claim 1 wherein said drive means includes oscillating means rotating said one of said rollers in one direction from said beginning position at one end of said clamp area portion to said ending position at the other end of said clamp area portion and then back to said beginning position.

7. Apparatus as claimed in claim 4 wherein said rolling surface of said one of said rollers has a plurality of lower grooves adjacent said first groove positioned in side by side spaced relationship on said one of said rollers, each of said lower grooves having a base surface and side surfaces for simultaneous rolling of a plurality of bead rings.

8. Apparatus as claimed in claim 7 wherein additional idler rollers are positioned at each side of said one of said rollers next to each of said lower grooves to guide bead rings in said lower grooves.

9. Apparatus as claimed in claim 3 including controls for pressure in said piston and cylinder assembly providing a sufficient pressure to compress said bead ring while maintaining said closely spaced non-engaging relationship of said rolling surfaces to compensate for variations in the coating of uncured rubber compound on said wire along said clamp area portion.

* * * * *